United States Patent
Lee

(10) Patent No.: US 11,922,301 B2
(45) Date of Patent: Mar. 5, 2024

(54) SYSTEM AND METHOD FOR DATA AUGMENTATION FOR TRACE DATASET

(71) Applicant: Samsung Display Co., Ltd., Yongin-si (KR)

(72) Inventor: Janghwan Lee, Pleasanton, CA (US)

(73) Assignee: Samsung Display Co., Ltd., Yongin-si (KR)

( * ) Notice: Subject to any disclaimer, the term of this patent is extended or adjusted under 35 U.S.C. 154(b) by 1184 days.

(21) Appl. No.: 16/442,298

(22) Filed: Jun. 14, 2019

(65) Prior Publication Data
US 2020/0320439 A1 Oct. 8, 2020

Related U.S. Application Data

(60) Provisional application No. 62/830,131, filed on Apr. 5, 2019.

(51) Int. Cl.
| | |
|---|---|
| *G06N 3/08* | (2023.01) |
| *G06F 18/21* | (2023.01) |
| *G06F 18/214* | (2023.01) |
| *G06F 18/2431* | (2023.01) |
| *G06N 3/008* | (2023.01) |
| *G06N 20/00* | (2019.01) |
| *G06N 20/10* | (2019.01) |
| *G06N 20/20* | (2019.01) |

(52) U.S. Cl.
CPC ............ *G06N 3/08* (2013.01); *G06F 18/2155* (2023.01); *G06F 18/217* (2023.01); *G06F 18/2431* (2023.01); *G06N 3/008* (2013.01); *G06N 20/00* (2019.01); *G06N 20/10* (2019.01); *G06N 20/20* (2019.01)

(58) Field of Classification Search
CPC ........ G06N 3/008; G06N 20/10; G06N 20/20; G06K 9/628; G06K 9/6262; G06K 9/6259

USPC .......................................................... 706/12
See application file for complete search history.

(56) References Cited

U.S. PATENT DOCUMENTS

| | | |
|---|---|---|
| 9,037,518 B2 | 5/2015 | Lakshminarayan et al. |
| 9,798,982 B2 | 10/2017 | Lin et al. |
| | (Continued) | |

FOREIGN PATENT DOCUMENTS

| | | |
|---|---|---|
| CN | 105589806 A | 5/2016 |
| CN | 107391370 A | 11/2017 |
| | (Continued) | |

OTHER PUBLICATIONS

Adaptive neighbor synthetic minority oversampling technique— (Year: 2016).*

(Continued)

*Primary Examiner* — Omar F Fernandez Rivas
*Assistant Examiner* — Em N Trieu
(74) *Attorney, Agent, or Firm* — Lewis Roca Rothgerber Christie LLP

(57) ABSTRACT

A system and method for classification. In some embodiments, the method includes forming a first training dataset and a second training dataset from a labeled input dataset; training a first classifier with the first training dataset; training a variational auto encoder with the second training dataset, the variational auto encoder comprising an encoder and a decoder; generating a third dataset, by feeding pseudorandom vectors into the decoder; labeling the third dataset, using the first classifier, to form a third training dataset; forming a fourth training dataset based on the third dataset; and training a second classifier with the fourth training dataset.

18 Claims, 10 Drawing Sheets

(56) References Cited

U.S. PATENT DOCUMENTS

| | | | |
|---|---|---|---|
| 10,043,261 | B2 | 8/2018 | Bhaskar et al. |
| 2008/0025591 | A1* | 1/2008 | Bhanot ................... G06F 18/40 382/224 |
| 2013/0097103 | A1 | 4/2013 | Chari et al. |
| 2013/0198118 | A1 | 8/2013 | Kowalczyk et al. |
| 2015/0278470 | A1* | 10/2015 | Bakker ................... G16H 50/70 705/2 |
| 2016/0092789 | A1 | 3/2016 | Codella et al. |
| 2016/0335548 | A1 | 11/2016 | Goh et al. |
| 2018/0165554 | A1* | 6/2018 | Zhang ................. G06F 18/2411 |
| 2018/0275642 | A1 | 9/2018 | Tajima et al. |
| 2019/0087728 | A1* | 3/2019 | Agarwal ................ G06N 3/047 |
| 2019/0370384 | A1* | 12/2019 | Dalek ................... G06F 16/285 |
| 2020/0065384 | A1 | 2/2020 | Costello |
| 2020/0097763 | A1* | 3/2020 | Haerterich ............. G06N 20/00 |
| 2020/0143274 | A1* | 5/2020 | Chitta .................... G06N 5/048 |
| 2020/0160201 | A1 | 5/2020 | Katuwal et al. |
| 2020/0210808 | A1* | 7/2020 | Dong ..................... G06N 3/084 |
| 2020/0226420 | A1 | 7/2020 | Shaubi et al. |
| 2020/0311572 | A1 | 10/2020 | Baker |

FOREIGN PATENT DOCUMENTS

| | | |
|---|---|---|
| CN | 107103332 B | 6/2018 |
| CN | 108563556 A | 9/2018 |
| EP | 3101599 A2 | 12/2016 |
| JP | 2018-160093 A | 10/2018 |
| KR | 10-1744194 | 6/2017 |
| TW | 201734955 A | 10/2017 |
| WO | 2019/017962 A1 | 1/2019 |
| WO | WO2019123451 A1 | 6/2019 |

OTHER PUBLICATIONS

Chakraborty, Debasrita, Vaasudev Narayanan, and Ashish Ghosh. "Integration of deep feature extraction and ensemble learning for outlier detection." Pattern Recognition 89 (2019): 161-171. (Year: 2019).

Guo, Ting, et al. "Discriminative sample generation for deep imbalanced learning." Twenty-Eighth International Joint Conference on Artificial Intelligence {IJCAI-19}. International Joint Conferences on Artificial Intelligence Organization, 2019. (Year: 2019).

Radosavovic, Ilija, et al. "Data distillation: Towards omni-supervised learning." Proceedings of the IEEE conference on computer vision and pattern recognition. 2018. (Year: 2018).

U.S. Office Action dated Oct. 13, 2022, issued in U.S. Appl. No. 16/682,815 (12 pages).

Abdulhammed, Razan, et al., "Deep and Machine Learning Approaches for Anomaly-Based Intrusion Detection of Imbalanced Network Traffic," IEEE Sensors Letters, IEEE, vol. 3, No. 1, Jan. 2019, 4 pages.

Wan, Zhiqiang, et al., "Variational Autoencoder Based Synthetic Data Generation for Imbalanced Learning," IEEE Symposium Series on Computational Intelligence, IEEE, 2017, 7 pages.

EPO Extended Search Report dated Aug. 18, 2020, issued in corresponding European Patent Application No. 20155921.8 (9 pages).

Jorge, Javier, et al., "Empirical Evaluation of Variational Autoencoders for Data Augmentation," VISAPP 2018—International Conference on Computer Vision Theory and Applications, vol. 5, 2018, pp. 96-104.

EPO Extended European Search Report dated Mar. 10, 2021, issued in European Patent Application No. 20198821.9 (9 pages).

U.S. Final Office Action dated Nov. 23, 2022, issued in U.S. Appl. No. 16/682,815 (14 pages).

Perez-Ortiz, Maria, et al. "Graph-based approaches for oversampling in the context of ordinal regression." IEEE Transactions on Knowledge and Data Engineering 27.5 (2014): 1233-1245. (Year: 2014).

U.S. Notice of Allowance dated Feb. 1, 2023, issued in U.S. Appl. No. 16/682,815 (9 pages).

Taiwanese Office Action dated Dec. 11, 2023, issued in corresponding Taiwanese Patent Application No. 109104858 (20 pages).

Japanese Office Action dated Dec. 19, 2023, issued in corresponding Japanese Patent Application No. 2020-029704 (4 pages).

* cited by examiner

| Train Accuracy (G/NG) | Validation Accuracy (G/NG) |
| --- | --- |
| 0.9546/1.0000 | 0.9111/0.8776 |

FIG. 4

| Train Accuracy (G/NG) | Validation Accuracy (G/NG) |
| --- | --- |
| 0.9938/0.9970 | 0.9989/0.9091 |

*FIG. 5*

SYSTEM AND METHOD FOR DATA AUGMENTATION FOR TRACE DATASET

CROSS-REFERENCE TO RELATED APPLICATION(S)

The present application claims priority to and the benefit of U.S. Provisional Application No. 62/830,131, filed Apr. 5, 2019, entitled "SYSTEM AND METHOD FOR DATA AUGMENTATION FOR TRACE DATASET", the entire content of which is incorporated herein by reference.

FIELD

One or more aspects of embodiments according to the present disclosure relate to classifiers, and more particularly to a system and method for data augmentation, for use in training a classifier.

BACKGROUND

Automatic classifiers may exhibit relatively poor performance when trained with data having a data imbalance over a binary class, or when the amount of training data is relatively small given the input data dimension.

Thus, there is a need for an improved system and method for data augmentation.

SUMMARY

According to an embodiment of the present invention, there is provided a method for classification, the method including: forming a first training dataset and a second training dataset from a labeled input dataset; training a first classifier with the first training dataset; training a variational auto encoder with the second training dataset, the variational auto encoder including an encoder and a decoder; generating a third dataset, by feeding pseudorandom vectors into the decoder; labeling the third dataset, using the first classifier, to form a third training dataset; forming a fourth training dataset based on the third dataset; and training a second classifier with the fourth training dataset.

In some embodiments, the first training dataset is the labeled input dataset.

In some embodiments, the second training dataset is the labeled input dataset.

In some embodiments, the forming of the first training dataset includes: oversampling the labeled input dataset, to produce a first supplementary dataset; and combining the labeled input dataset and the first supplementary dataset to form the first training dataset.

In some embodiments, the oversampling of the labeled input dataset includes using a synthetic minority oversampling technique.

In some embodiments, the oversampling of the labeled input dataset includes using an adaptive synthetic oversampling technique.

In some embodiments, the fourth training dataset is the same as the third training dataset.

In some embodiments, the forming of the fourth training dataset includes combining: a first portion of the labeled input dataset, and the third training dataset to form the fourth training dataset.

In some embodiments, the forming of the fourth training dataset includes combining: a first portion of the labeled input dataset, the first supplementary dataset, and the third training dataset to form the fourth training dataset.

In some embodiments, he method further includes validating the second classifier with a second portion of the labeled input dataset, different from the first portion of the labeled input dataset.

In some embodiments, the forming of the second training dataset includes: oversampling the labeled input dataset, to produce a first supplementary dataset; and combining the labeled input dataset and the first supplementary dataset to form the second training dataset.

In some embodiments, the labeled input dataset includes: majority class data including a first number of data elements and minority class data including a second number of data elements, the first number exceeding the second number by a factor of at least 5.

In some embodiments, the first number exceeds the second number by a factor of at least 15.

According to an embodiment of the present invention, there is provided a system, including: a processing circuit configured to: form a first training dataset and a second training dataset from a labeled input dataset; train a first classifier with the first training dataset; train a variational auto encoder with the second training dataset, the variational auto encoder including an encoder and a decoder; generate a third dataset, by feeding pseudorandom vectors into the decoder; label the third dataset, using the first classifier, to form a third training dataset; form a fourth training dataset based on the third dataset; and train a second classifier with the fourth training dataset.

In some embodiments, the first training dataset is the labeled input dataset.

In some embodiments, the second training dataset is the labeled input dataset.

In some embodiments, the forming of the first training dataset includes: oversampling the labeled input dataset, to produce a first supplementary dataset; and combining the labeled input dataset and the first supplementary dataset to form the first training dataset.

In some embodiments, the oversampling of the labeled input dataset includes using a synthetic minority oversampling technique.

In some embodiments, the oversampling of the labeled input dataset includes using an adaptive synthetic oversampling technique.

According to an embodiment of the present invention, there is provided a system for classifying manufactured parts as good or defective, the system including: a data collection circuit; and a processing circuit, the processing circuit being configured to: form a first training dataset and a second training dataset from a labeled input dataset; train a first classifier with the first training dataset; train a variational auto encoder with the second training dataset, the variational auto encoder including an encoder and a decoder; generate a third dataset, by feeding pseudorandom vectors into the decoder; label the third dataset, using the first classifier, to form a third training dataset; form a fourth training dataset based on the third dataset; and train a second classifier with the fourth training dataset.

BRIEF DESCRIPTION OF THE DRAWINGS

These and other features and advantages of the present disclosure will be appreciated and understood with reference to the specification, claims, and appended drawings wherein:

FIG. 4 is a table of test results, according to an embodiment of the present disclosure; and FIG. 5 is a table of test results, according to an embodiment of the present disclosure.

DETAILED DESCRIPTION

The detailed description set forth below in connection with the appended drawings is intended as a description of exemplary embodiments of a system and method for data augmentation provided in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

A classifier over a binary class may have the task assigning data samples to one of two classes, and there may be a significant imbalance in the training data used to train such classifier. For example, in a manufacturing process for manufacturing electronic parts, it may be the case that the majority of the parts are acceptable, or "good", and a small minority of the parts are in some way defective, or "no good". For this reason, when data are obtained during the manufacturing and testing process, most of the data may be from good devices, i.e., an imbalance may be present in the data. Such an imbalance may be an obstacle when training an automated classifier to classify parts as "good" or "no good".

Further, the number of measurements obtained for each part may be large, i.e., the number of dimensions of each data sample (a data element being the set of measurements for an item, such as a manufactured part, to be classified) may be large. This may be a further obstacle when training an automated classifier, especially when the number of training data elements in either class is small in light of the dimensions of each data element.

For example, when manufacturing mobile displays, trace data may be acquired during the manufacturing process for display panels. The trace data may include, for example, measurements of temperature and pressure in the manufacturing process, as a function of time. Multiple temperature and pressure sensors may be used, and each sensor may be sampled multiple times (e.g., three or four times per day, over a period of multiple days). The trace data resulting from these measurements may, for example, include about 64 time traces each having about 304 measurements, e.g., a total of over 19,000 measurements, so that each data element has over 19,000 dimensions.

Figure 1:
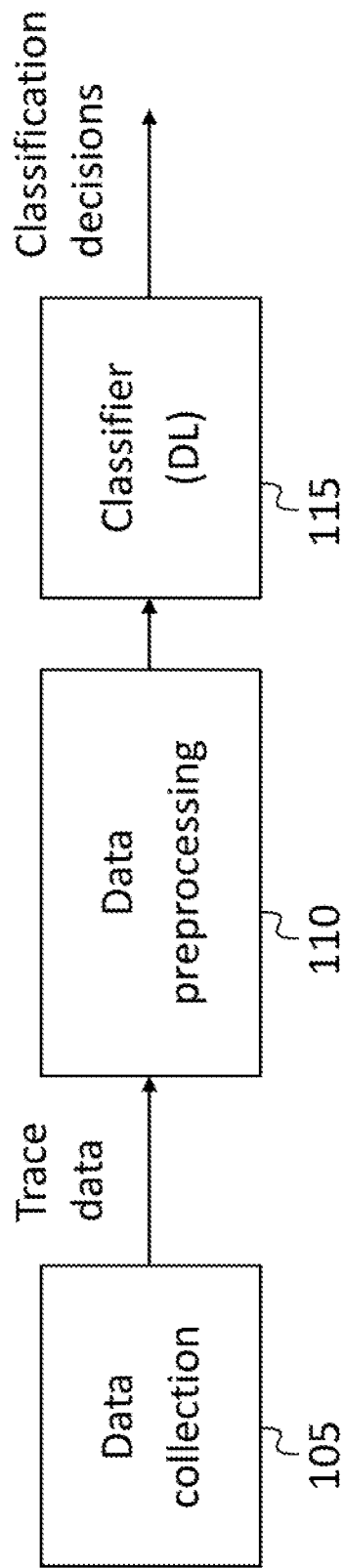
FIG. 1 is a block diagram of a system for classifying, according to an embodiment of the present disclosure.

Various methods, as described in further detail below, may be used to address some of the obstacles mentioned above. Referring to FIG. 1, in some embodiments a system for detecting faulty parts includes one or more data collection circuits 105 (which may include, for example, temperature and pressure sensors, amplifiers, and analog to digital converters), a data preprocessing circuit 110 (which may reformat the data, as discussed in further detail below), and a classifier 115, which may be a deep learning (DL) neural network.

The data preprocessing circuit 110 may receive raw trace data (e.g., a number of time traces, as mentioned above) from the data collection circuits 105 and may reformat the data, e.g., into two dimensional arrays (e.g., 224×224 arrays). The size of the two dimensional arrays may be selected to be comparable to the size of images commonly classified by neural networks. The reformatting may then make it possible to reuse certain portions of the code implementing a neural network classifier of images, for use in some embodiments.

Figure 2:
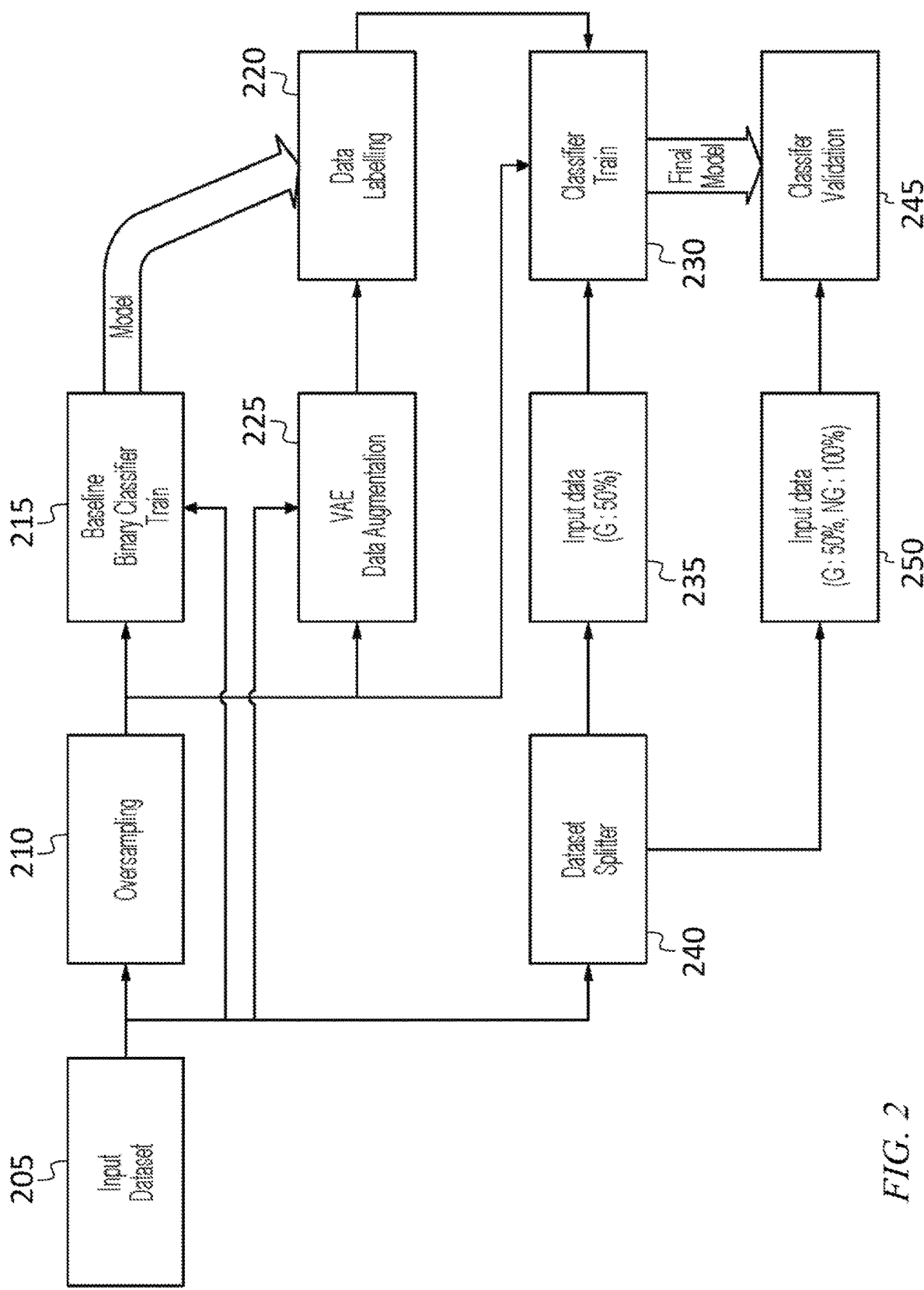
FIG. 2 is a flow chart of a method for training and validating a classifier, according to an embodiment of the present disclosure.

FIG. 2 shows a flow chart for the development and testing of a classifier, in some embodiments. A labeled input dataset 205 is received from the preprocessing circuit 110, the labeled input dataset 205 including first number of data samples (e.g., a few thousand data elements) each labelled "good" (or "G"), and a second number of data samples (e.g., between 10 and 100 data elements) each labelled "no good" (or "NG"). Oversampling may be employed at 210 (as discussed in further detail below) to generate a first supplementary dataset including additional data samples in one or both classes. The labeled input dataset 205 and the first supplementary dataset may then be used to train, at 215, a first classifier (or "baseline classifier"), using supervised learning with a first training dataset (which may be the combination (or "union") of, i.e., which may include both of, the labeled input dataset 205 and the first supplementary dataset). In some embodiments the step of oversampling, at 210, or its results, may be omitted, and the first classifier may be trained using only the labeled input dataset 205.

The model resulting from the training of the first classifier (e.g., the trained first classifier, or a copy of its neural network, programmed with the weights resulting from the training of the first classifier) may then be used, at 220, to label a third data set, to form a third training dataset. The machine learning model may be any one of multiple forms including a classifier, a regressor, an autoencoder, etc. The third data set may be generated, at 225, by a data augmentation method using a variational auto encoder as discussed in further detail below. The data augmentation method, at 225, may use as input a second training dataset, which may be, for example, the labeled input dataset 205, or the combination of the labeled input dataset 205 and the first supplementary dataset.

A second classifier may then be trained, at 230, using a combination of one or more portions of (i) a first portion 235 of the labeled input dataset 205 (produced from the labeled input dataset 205 by a data splitter 240), (ii) the first supplementary dataset, and (iii) the third training dataset. The model resulting from the training of the second classifier (e.g., the trained second classifier, or a copy of its neural network, programmed with the weights resulting from the training of the second classifier) may then be validated, at 245, using a second portion 250 of the labeled input dataset 205 (also produced from the labeled input dataset 205 by the data splitter 240). The second portion 250 (which is used for validation) may be different from the first portion 235 (which is used for training), e.g., it may be the remainder of the labeled input dataset 205.

The performance of the second classifier after training (i.e., the performance of the model resulting from the training of the second classifier) in the validation step, at 245, may be used to assess whether the second classifier is suitable for use in production, e.g., to make a determination, for each manufactured part, whether it is to be used, or discarded (or reworked).

Figure 3A:
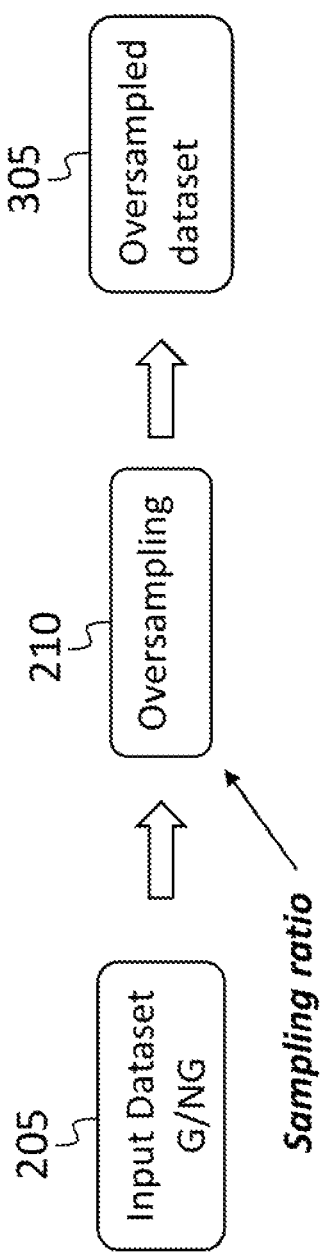
FIG. 3A is a flow chart of a portion of a method for training and validating a classifier, according to an embodiment of the present disclosure.

FIG. 3A is a flowchart of the oversampling step (at 210, in FIG. 2). The labeled input dataset 205 is oversampled, at 210, forming the first supplementary dataset (or "oversampled dataset") 305. The oversampling may be performed using SMOTE (Synthetic Minority Over-sampling Technique) or ADASYN (Adaptive Synthetic) oversampling, each of which may be used to create a dataset of data elements in the minority class (e.g., the "no good" class). ADASYN may offset each of the data elements produced by adding to it a small random vector (or "offset"), to reduce the likelihood that the data elements of the first supplementary dataset may interfere with the other class (e.g., the majority class, which may be the "good" class).

Figure 3B:
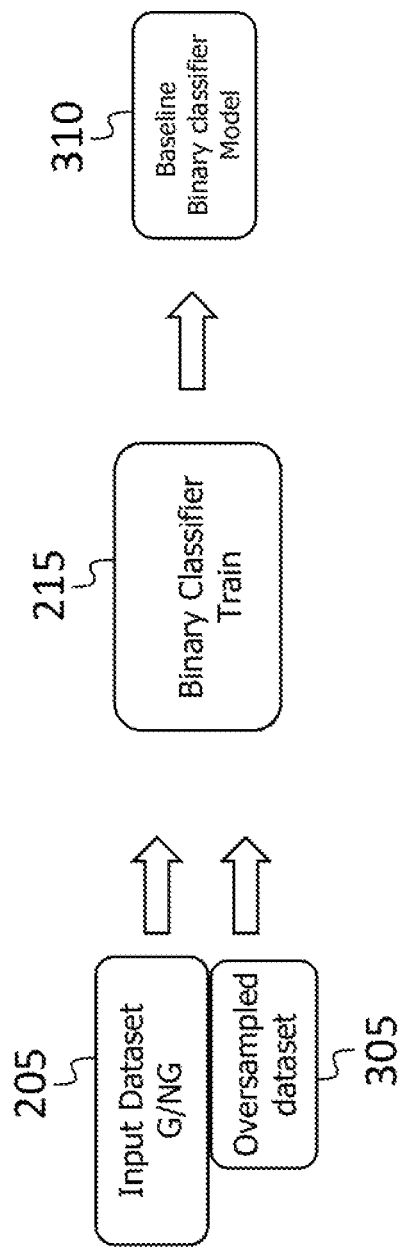
FIG. 3B is a flow chart of a portion of a method for training and validating a classifier, according to an embodiment of the present disclosure.

FIG. 3B is a flowchart of the training, at 215 (FIG. 2) of the first classifier. One or both of (i) the labeled input dataset 205 and (ii) the first supplementary dataset 305 are used, at 215, to train the first classifier, resulting in a first classifier model (or "baseline binary classifier model") 310.

Figure 3C:
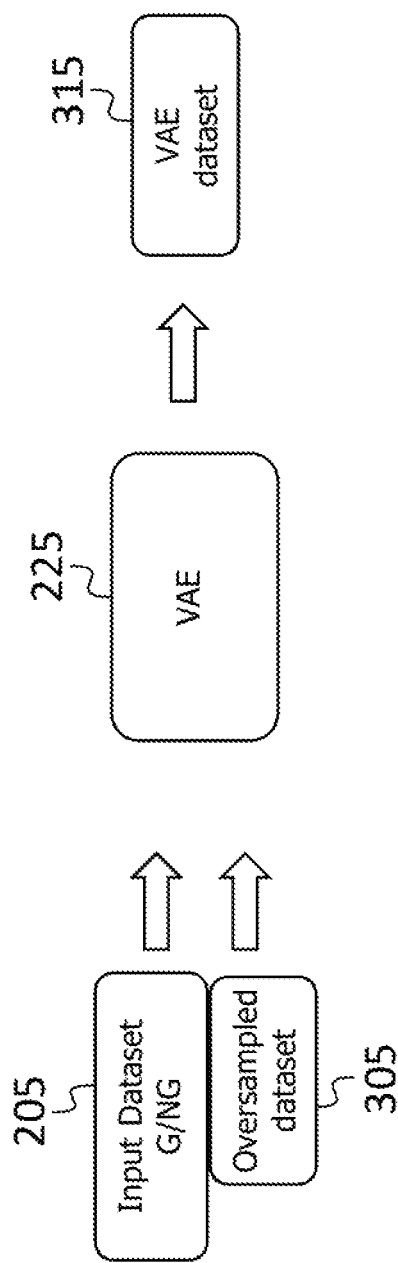
FIG. 3C is a flow chart of a portion of a method for training and validating a classifier, according to an embodiment of the present disclosure.

FIG. 3C is a flowchart of the data augmentation (at 225, FIG. 2). The variational auto encoder may include an encoder, and a decoder. The encoder may map, or "encode" each received data element into a vector, or "latent vector", subject to the constraint that the latent vectors have a distribution that approximates a unit Gaussian distribution (i.e., that approximates a vector distribution for which the elements of the vector are independent Gaussian distributions, e.g., each having a mean and a variance). The decoder may perform an approximate inverse of the operation of the encoder; it may map each latent vector produced by the encoder into a (synthetic) data element that approximates the data element the encoder would map into the latent vector. The encoder and decoder may be trained together, with a training set of representative data elements (e.g., the second training set mentioned above), and a cost function that is a measure of the difference between the input to the encoder and the output of the decoder with regularization for Gaussian distribution. Once the encoder and decoder have been trained, pseudorandom latent vectors (generated to have a unit Gaussian distribution) may be fed into the decoder, to generate synthetic data elements (e.g., to generate the third data set 315). If the variational auto encoder is trained with data elements from both classes (i.e., with both "good" data elements and "no good" data elements), then the synthetic data elements may be unlabeled.

Figure 3D:
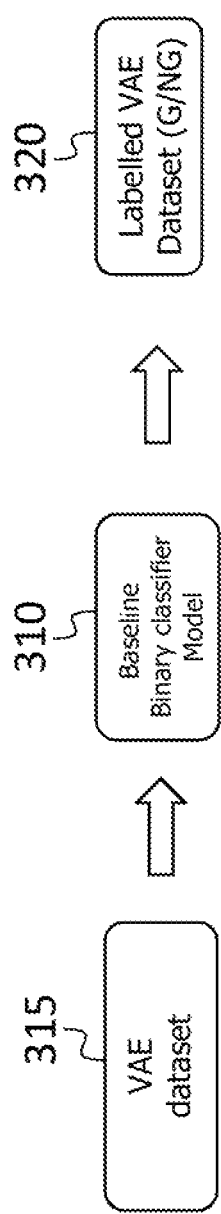
FIG. 3D is a flow chart of a portion of a method for training and validating a classifier, according to an embodiment of the present disclosure.
Figure 3E:
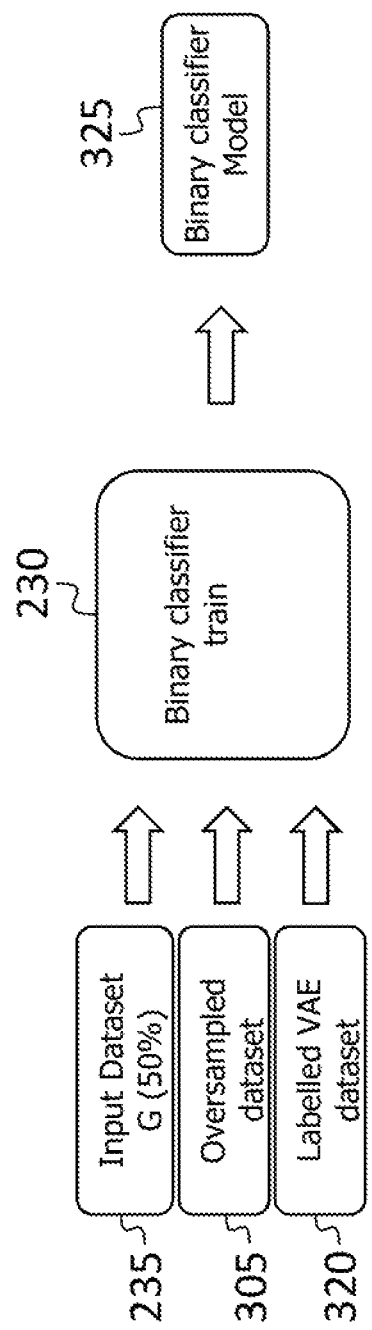
FIG. 3E is a flow chart of a portion of a method for training and validating a classifier, according to an embodiment of the present disclosure.
Figure 3F:
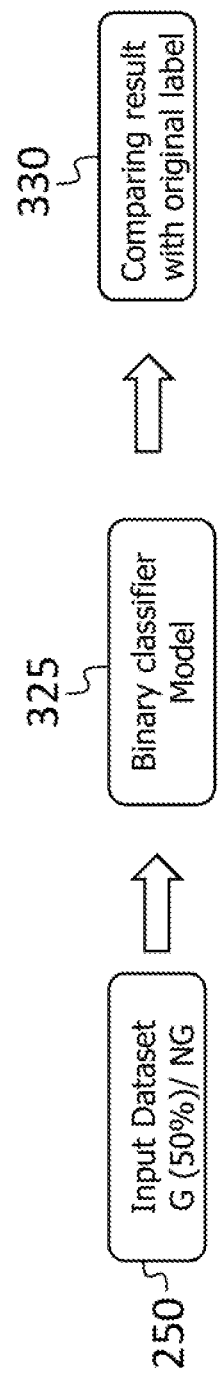
FIG. 3F is a flow chart of a portion of a method for training and validating a classifier, according to an embodiment of the present disclosure.

FIG. 3D is a flowchart of the labelling (at 220, in FIG. 2) of the third data set, to form the third training dataset. The third data set 315 is classified by the first classifier model 310 and each data element of the third data set 315 is labeled, to form the third training dataset (or "labelled VAE dataset") 320. FIG. 3E is a flowchart of the training of the second classifier (at 230, in FIG. 2). One or more of (or respective portions of one or more of) (i) the first portion 235 of the labeled input dataset 205 (produced from the labeled input dataset 205 by the data splitter 240), (ii) the first supplementary dataset 305 and (iii) the third training dataset 320 are used, at 230, to train the second classifier, resulting in a second classifier model (or "binary classifier model") 325. FIG. 3F is a flowchart of the classifier validation (at 245, in FIG. 2). Each data element of the second portion 250 of the labeled input dataset 205 is fed into the trained second classifier (or the "second classifier model") 325, and each classification produced is compared, at 330, with the label of the data element. The performance of the second classifier is then assessed based on the extent to which the classifications agree with the labels.

The table of FIG. 4 shows results of a test performed with one embodiment of the baseline model 310, using oversampling and 80% of original G dataset. A labeled input dataset 205, including 3936 data elements in the "good" class and 22 data elements in the "good" class, was processed according to the method illustrated in FIG. 2. Oversampling (at 210, in FIG. 2) was used to increase the ratio of (i) "no good" data elements to (ii) "good" data elements to either 0.1:1 or 1:1. The table of FIG. 4 shows (in the first column) the classification accuracy for "good" and "no good" data elements, for the training dataset used, and (in the second column), the classification accuracy for "good" and "no good" data elements, for the validation dataset.

The table of FIG. 5 shows the results of a performance test of the second classifier model 325, in one embodiment. The second classifier was trained with (i) synthetic samples from the VAE (the third training dataset), including 3238 G samples and 6762 NG samples, (ii) 2000 NG samples produced by oversampling, and (iii) 2000 real G samples, selected randomly from among the G samples in the input dataset.

It may be seen that the performance shown in FIG. 5 is significantly better than the performance shown in FIG. 4, i.e., that in the tests corresponding to FIGS. 4 and 5 respectively the second classifier significantly outperformed the first (baseline) classifier. Moreover, the results of FIG. 5 were achieved using a smaller fraction of the G samples of the input dataset 205; 80% of the G samples of the input dataset 205 were used to train the classifier in the test that produced the results of FIG. 4, whereas only 50.8% of the G samples (2000 G samples) of the input dataset 205 were used to train the classifier in the test that produced the results of FIG. 5.

In some embodiments, k-fold validation is used to obtain a more reliable assessment of the accuracy of a classifier 115 constructed according to methods described herein.

In some embodiments, each of the first classifier (or "first classifier model") 310 and the second classifier (or "second classifier model") 325 may be a SqueezeNet, ResNet, or VggNet neural network, suitably trained, as described herein. The variational auto encoder may be constructed as described in "Auto-Encoding Variational Bayes" by D. Kingma and M. Welling, available at arxiv.org/abs/1312.6114, the entire content of which is incorporated herein by reference.

In some embodiments, one or more of the data preprocessing circuit 110, the classifier 115, and the system that executes the method illustrated in FIG. 2, is implemented in one or more processing circuits. The term "processing circuit" is used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example a processing circuit may include two processing circuits, an FPGA and a CPU, interconnected on a PCB.

As used herein, a "portion" of a thing means all of, or less than all of, the thing. As such, a portion of a dataset means a proper subset of the dataset, or the entire dataset.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art. As used herein, the term "major component" refers to a component that is present in a composition, polymer, or product in an amount greater than an amount of any other single component in the composition or product. In contrast, the term "primary component" refers to a component that makes up at least 50% by weight or more of the composition, polymer, or product. As used herein, the term "major portion", when applied to a plurality of items, means at least half of the items.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein.

Although exemplary embodiments of a system and method for data augmentation have been specifically described and illustrated herein, many modifications and variations will be apparent to those skilled in the art. Accordingly, it is to be understood that a system and method for data augmentation constructed according to principles of this disclosure may be embodied other than as specifically described herein. The invention is also defined in the following claims, and equivalents thereof.

What is claimed is:

1. A method for classification, the method comprising:
   forming a first training dataset and a second training dataset from a labeled input dataset, wherein the forming of the first training dataset includes:
      oversampling the labeled input dataset to produce a first supplementary dataset; and
      combining the labeled input dataset and the first supplementary dataset to form the first training dataset;
   training a first classifier with the first training dataset;
   training a variational auto encoder with the second training dataset, the variational auto encoder comprising an encoder and a decoder;
   generating a third dataset, by feeding pseudorandom vectors into the decoder, the decoder generating an output based on the pseudorandom vectors, wherein the third dataset is generated based on the output;
   labeling the third dataset, using the first classifier, to form a third training dataset;
   forming a fourth training dataset based on the third training dataset; and
   training a second classifier with the fourth training dataset.

2. The method of claim 1, wherein the first training dataset is the labeled input dataset.

3. The method of claim 1, wherein the second training dataset is the labeled input dataset.

4. The method of claim 1, wherein the oversampling of the labeled input dataset comprises using a synthetic minority over-sampling technique.

5. The method of claim 1, wherein the oversampling of the labeled input dataset comprises using an adaptive synthetic over-sampling technique.

6. The method of claim 1, wherein the fourth training dataset is the same as the third training dataset.

7. The method of claim 1, wherein the forming of the fourth training dataset comprises combining:
   a first portion of the labeled input dataset, and
   the third training dataset
   to form the fourth training dataset.

8. The method of claim 1, wherein the forming of the fourth training dataset comprises combining:
  a first portion of the labeled input dataset,
  the first supplementary dataset, and
  the third training dataset
  to form the fourth training dataset.

9. The method of claim 8, further comprising validating the second classifier with a second portion of the labeled input dataset, different from the first portion of the labeled input dataset.

10. The method of claim 1, wherein the forming of the second training dataset comprises:
  oversampling the labeled input dataset, to produce a second supplementary dataset; and
  combining the labeled input dataset and the second supplementary dataset to form the second training dataset.

11. The method of claim 1, wherein the labeled input dataset comprises:
  majority class data comprising a first number of data elements and
  minority class data comprising a second number of the data elements,
  the first number exceeding the second number by a factor of at least 5.

12. The method of claim 11, wherein the first number exceeds the second number by a factor of at least 15.

13. A system, comprising:
  a processing circuit configured to:
    form a first training dataset and a second training dataset from a labeled input dataset, wherein in forming the first training dataset, the processing circuit is further configured to:
      oversample the labeled input dataset to produce a first supplementary dataset; and
      combine the labeled input dataset and the first supplementary dataset to form the first training dataset;
    train a first classifier with the first training dataset;
    train a variational auto encoder with the second training dataset, the variational auto encoder comprising an encoder and a decoder;
    generate a third dataset, by feeding pseudorandom vectors into the decoder, the decoder generating an output based on the pseudorandom vectors, wherein the third dataset is generated based on the output;
    label the third dataset, using the first classifier, to form a third training dataset;
    form a fourth training dataset based on the third training dataset; and
    train a second classifier with the fourth training dataset.

14. The system of claim 13, wherein the first training dataset is the labeled input dataset.

15. The system of claim 13, wherein the second training dataset is the labeled input dataset.

16. The system of claim 13, wherein the oversampling of the labeled input dataset comprises using a synthetic minority over-sampling technique.

17. The system of claim 13, wherein the oversampling of the labeled input dataset comprises using an adaptive synthetic over-sampling technique.

18. A system for classifying manufactured parts as good or defective, the system comprising:
  a data collection circuit; and
  a processing circuit,
  the processing circuit being configured to:
    form a first training dataset and a second training dataset from a labeled input dataset, wherein in forming the first training dataset, the processing circuit is further configured to:
    oversample the labeled input dataset to produce a first supplementary dataset; and
    combine the labeled input dataset and the first supplementary dataset to form the first training dataset;
    train a first classifier with the first training dataset;
    train a variational auto encoder with the second training dataset, the variational auto encoder comprising an encoder and a decoder;
    generate a third dataset, by feeding pseudorandom vectors into the decoder, the decoder generating an output based on the pseudorandom vectors, wherein the third dataset is generated based on the output;
    label the third dataset, using the first classifier, to form a third training dataset;
    form a fourth training dataset based on the third training dataset; and
    train a second classifier with the fourth training dataset.

* * * * *